US006894107B2

(12) United States Patent
Gore

(10) Patent No.: US 6,894,107 B2
(45) Date of Patent: *May 17, 2005

(54) SYSTEMS AND METHODS FOR CREATING PERMANENT IMAGES ON SUBSTRATES USING INK-JET TECHNOLOGY

(75) Inventor: Makarand P Gore, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 97 days.

This patent is subject to a terminal disclaimer.

(21) Appl. No.: 10/013,579

(22) Filed: Dec. 7, 2001

(65) Prior Publication Data

US 2002/0065339 A1 May 30, 2002

Related U.S. Application Data

(63) Continuation-in-part of application No. 09/295,665, filed on Apr. 21, 1999.

(51) Int. Cl.$^7$ ............ C08L 39/00; C08L 37/00; C08L 39/04; B41J 2/01; C09D 11/02
(52) U.S. Cl. ............ 524/555; 524/548; 524/549; 347/98; 347/101; 523/160
(58) Field of Search .............. 523/160, 161; 347/96, 98, 101; 524/548, 549, 555

(56) References Cited

U.S. PATENT DOCUMENTS

| | | | |
|---|---|---|---|
| 3,529,129 A | 9/1970 | Rees | |
| 4,500,895 A | 2/1985 | Buck et al. | |
| 4,513,298 A | 4/1985 | Scheu | |
| 4,794,409 A | 12/1988 | Cowger et al. | |
| 5,249,062 A | 9/1993 | Ejiri et al. | |
| 5,537,137 A | 7/1996 | Held et al. | |
| 5,549,740 A | 8/1996 | Takahashi et al. | |
| 5,596,027 A | 1/1997 | Mead et al. | |
| 5,640,187 A | 6/1997 | Kashiwazaki et al. | |
| 5,698,017 A | 12/1997 | Sacripante et al. | |
| 5,792,249 A | 8/1998 | Shirota et al. | |
| 5,817,169 A | 10/1998 | Sacripante et al. | |
| 5,831,655 A | 11/1998 | Asawa et al. | |
| 5,846,306 A | 12/1998 | Kubota et al. | |
| 5,854,307 A | 12/1998 | Kimura et al. | |
| 5,854,331 A * | 12/1998 | Ma et al. | 524/505 |
| 5,889,083 A | 3/1999 | Zhu | |
| 5,912,280 A | 6/1999 | Anton et al. | |
| 5,936,008 A | 8/1999 | Jones et al. | |
| 6,027,210 A | 2/2000 | Kurabayashi et al. | |
| 6,080,229 A | 6/2000 | Watanabe et al. | |
| 6,276,792 B1 | 8/2001 | Gundlach et al. | |
| 6,406,143 B1 * | 6/2002 | Chen et al. | 347/105 |
| 6,417,248 B1 * | 7/2002 | Gore | 523/160 |
| 6,428,148 B1 * | 8/2002 | Gore | 347/55 |
| 2002/0077386 A1 * | 6/2002 | Kurabayashi et al. | 523/161 |

FOREIGN PATENT DOCUMENTS

| | | |
|---|---|---|
| EP | 0606490 A1 | 7/1993 |
| EP | 0591916 A2 | 10/1993 |
| EP | 0775596 A1 | 11/1995 |

* cited by examiner

Primary Examiner—Callie Shosho

(57) ABSTRACT

The invention relates to an improved systems and methods for ink-jet printing which result in images with increased permanence as measured by transfer of black or color from the image when the image is subjected to mechanical and/or chemical abrasion. The invention provides a fusible composition that may be combined with any or all of the black or color inks used to create the image, or it may be used as a colorless fluid applied during pre-, post-, or simultaneous ink-jet ink printing, with the proviso that both the ink-jet ink and the fusible composition be mixed in a liquid form for fusion. The permanence of images produced by the system can be comparable to those produced by electrophotography.

39 Claims, No Drawings

SYSTEMS AND METHODS FOR CREATING PERMANENT IMAGES ON SUBSTRATES USING INK-JET TECHNOLOGY

This application is a continuation-in-part of U.S. patent application Ser. No. 09/295,665, filed Apr. 21, 1999.

FIELD OF THE INVENTION

The present invention relates to printing technology. More specifically, it relates to systems and methods of creating a permanent image on a substrate using ink-jet ink technology. Even more specifically, the ink-jet printing method can utilize improved ink compositions to produce permanent printed images on a variety of substrates using specific water-soluble monomers and/or polymers.

BACKGROUND OF THE INVENTION

Along with the computerization of offices in the 1980's came electronically controlled non-impact printers such as the ink-jet and laser printers. Drop-on-demand ink-jet printers can be piezo or thermal. With piezo ink-jet systems, ink droplets can be ejected by an oscillating piezo crystal. However, thermal ink-jet printers dominates the drop-on-demand office ink-jet market. With this system, rapid heating behind the ink nozzles cause a bubble of vapor to form in the ink. The resulting bubble expansion and ink ejection from the ink-jet printer cartridge causes printing to appear on the substrate.

At the present time, full-color ink-jet printers are more common than color laser printers and are much more economical. The main advantage of ink-jet printers over laser printers and other non-impact printing techniques include their low cost and simplicity. Thermal ink-jet systems are capable of dispensing ink rapidly and accurately. The technology of this and other ink-jet systems are discussed in the *Chemistry and Technology of Printing and Imaging Systems*, edited by P. Gregory, published by Chapman & Hall, 1996. Representative thermal ink-jet systems and cartridges are discussed in U.S. Pat. No. 4,500,895 to Buck et al., U.S. Pat. No. 4,513,298 to Scheu, and U.S. Pat. No. 4,794,409 to Cowger et al., which are all hereby incorporated by reference.

The technology associated with ink-jet printers has undergone many changes and improvements since they first appeared. Research has been conducted to ensure that the images produced are of consistent high quality. Thus, in one aspect, it can be important that the images be waterfast and do not smear, smudge, run, or the like, when exposed to chemical or mechanical abrasion. Non-smearing of an ink-jet printed image when portion of the image is highlighted with a colored marker is of particular interest, as it provides a simple means of judging smudge resistance. Oftentimes, an image produced by an ink-jet printer on paper is not satisfactorily fixed, and thus, can smear, blurring the printed image when subjected to highlighting. This type of image is not regarded as permanent.

Image permanence can be defined as transference of color from the substrate when the image printed thereon is subjected to chemical and mechanical abrasion. Highlighting is oftentimes the form of chemical and mechanical abrasion experienced. This transference of color is measured by optical density. More permanent images have lower milli-Optical Density (mOD) values.

Another desired feature of printed images is light fastness. As used herein, light fastness will mean that the images do not significantly fade over time when exposed to light. Light fastness is another measure of permanence as used herein. Light fastness can be measured by exposing a printed image to intense light in a light chamber (fadomer) and comparing print density before and after the exposure.

There have been many past attempts of improving the permanence of water-based ink-jet printing systems. Included among these attempts are U.S. Pat. No. 5,549,740 to Takahashi et al., U.S. Pat. No. 5,640,187 to Kashiwakazi et al., and U.S. Pat. No. 5,792,249 to Shirota et al. which utilizes an additional or "fifth" pen to apply a colorless fluid on to the substrate. As will be seen in the comparative testing, the mOD values for the images printed thereon are quite high.

Another highly efficient printing system in common use currently is the laser printing system. With a laser printer or copier, light from a laser beam is used to discharge areas of a photoreceptor to create an electrostatic image of the page to be printed. The image is created by a printer controller, a dedicated computer in the printer, and is passed to the print engine. The print engine transcribes an array of dots created by the printer controller into a printed image. The print engine can include a laser scanning assembly, photoreceptor, toner hopper, developer unit, corotrons, discharge lamp, fuser, paper transport, paper input feeders, and paper output trays.

The final stage of laser printing or copying is to fix the toner onto the paper. Toner is very fine plastic powder that is transferred from the photoreceptor to the paper. Once transferred from the photoreceptor, it lies on the paper in a very thin coating with nothing to hold it in place. In order to fix the toner to the paper, it is typically heated by passing between a pair of very hot rollers, so that the plastic melts around the fibers of the paper and is "fused" into place. The image is now fixed permanently onto the paper.

The fuser of a typical laser printer is of particular interest to the printing system of the present invention. In these systems, fusing or melting the polymeric resin in which the colorant is embedded converts the discrete toner particles into an amorphous film. This film becomes the permanent image that results in electrophotographic copy or laser printed copy. However, laser printer toners are typically incompatible with water.

Another printing technology that is inherently more permanent than water-based ink-jet inks are hot-melt inks. These materials are solid at room temperature and are similar to wax crayons. The colorants used in these materials are solvent dyes that are soluble in the ink vehicle or pigment dispersions. Like laser toners, these materials are typically incompatible with the inks used in ink-jet printing.

U.S. Pat. Nos. 5,817,169 and 5,698,017, both to Sacripante et al., disclose hot melt ink compositions which use oxazoline as a vehicle used for a colorant in a nonaqueous, hot melt, ink-jet ink. One of the advantages of this technology is the waxy nature of the hot melt ink creates images that are more waterfast and may be successfully utilized on plain papers. This technology is in contrast with the instant invention, which can utilize an ordinary aqueous four-color ink pen set.

Accordingly, a need remains for a printing system using water-based ink-jet technology, which produces permanent images, and can be printed on plain paper substrates. In addition to plain paper substrates, these permanent images will be consistent and stable with respect to a variety of other substrates. An ideal situation would be combining the convenience and safety of aqueous ink-jet inks with the permanence of electrophotographic copies. The present invention satisfies this in a unique manner, which is described herein.

SUMMARY OF THE INVENTION

The invention relates to a fusible material, which can be added to aqueous ink formulations and provide an improved printed image once fused, which is especially suitable for use with ink-jet technology.

In accordance with an embodiment of the present invention, a method for printing permanent images using ink-jet technology can comprise the use of a fusible composition formulated with a four-pen ink-set commonly found in water-based color inks used in ink-jet printing. Thus, the fusible composition can be included within an ink-jet ink composition as a liquid mixture. Alternatively, the fusible composition can be formulated as an essentially colorless fluid applied either before or after the color inks are applied to the substrate, or applied such that partial overlap occurs in some circumstances, thus, forming a liquid mixture on the substrate. In either case, the ink and fusible composition containing liquid mixture can then be fused by one of a variety of methods known in the art to create images having good permanence and print quality that can be comparable to permanence and print quality provided by laser printers and copiers. These images, in black or color, are substantially permanent and will not smear, smudge, run, or the like when exposed to mechanical or chemical abrasion.

The invention also relates to a printing device incorporating the ejection of droplets of fluid on to a substrate and producing a printed page with a permanent image. In this embodiment, the ink-jet printer is equipped with a fuser. The fuser of a typical laser printer is commercially available and can be modified for use in an ink-jet printer to provide superior image quality and permanence to the printed substrate. In a similar fashion, incandescent lamps, heated rollers, or other suitable heating means may be employed.

This invention also provides an improved printing system which produces consistent high quality printed images regardless of the type or quality of printing substrate being used, e.g., plain paper or plastic transparent sheets used to make overhead projections (transparencies). Thus, the substrate need not be pre-coated with a fusible composition prior to ink-jetting a black- or color-containing ink-jet ink and a fusible composition onto the substrate to form a liquid mixture. Further with this system, the fuser is preferably activated before the liquid mixture is dry.

In accordance with the foregoing, the present invention relates to improved printing systems and methods for producing stable, water-fast, permanent printed images. The systems and methods combine the ease and versatility of traditional water-based ink-jet technology with the permanence of laser printing or copying technology (electrophotography).

Additional features and advantages of the invention will be apparent from the detailed description which follows.

DETAILED DESCRIPTION OF THE PREFERRED EMBODIMENT(S)

For the purposes of promoting an understanding of the principles of the invention, reference will now be made to the exemplary embodiments, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

The singular forms "a," "an," and, "the" include plural referents unless the context clearly dictates otherwise. Thus, for example, reference to "an ink" includes reference to one or more of such inks.

As used herein, "effective amount" refers to the minimal amount of a substance or agent, which is sufficient to achieve a desire effect. For example, an effective amount of a "liquid vehicle" is the minimum amount required in order to create an ink composition or fusible composition, while maintaining properties necessary for effective ink-jetting.

As used herein, "liquid vehicle" or "ink vehicle" refers to the vehicle in which colorant or fusible composition is placed to form an ink. Ink vehicles are well known in the art, and a wide variety of ink vehicles may be used with the systems and methods of the present invention. Such ink vehicles may include a mixture of a variety of different agents, including, surfactants, solvents, co-solvents, buffers, biocides, viscosity modifiers, surface-active agents, and water.

The present invention relates to improved printing methods and systems that are capable of producing permanent images on a variety of substrates using waterborne ink-jet printing technology. The invention allows for the inclusion of fusible materials into water-based inks or substantially colorless water-based compositions for liquid mixture with such inks on the substrate, and can provide printed and fused images having increased permanence.

The standard ink set components known and used in ink-jet printers comprise four colors of ink, namely yellow, magenta, cyan, and black. This set is often referred to as a "four pen" system. These inks in these four pens are made of various materials which are formulated into aqueous inks.

Each of the standard four pens can contain a water-soluble or insoluble dye having an anionic group, or when a pigment is used as a colorant, the pigment can either be self-dispersing or aided in solubility by a dispersant. In some applications, both pigments and dyes can be used together for providing color to an ink-jet ink. Ink formulations also typically contains water, a water-miscible solvent, and oftentimes, other components can be present such as biocides, viscosity modifiers, pH adjusters, preservatives, surfactants, and other known additives.

In an embodiment of the present invention, a method for creating a permanent image on a substrate can comprise the steps of ink-jetting a black- or color-containing ink-jet ink composition onto a substrate; ink-jetting a fusible composition in a liquid vehicle onto the substrate; contacting the ink-jet ink composition and the fusible composition such that the ink-jet ink composition and the fusible composition are in the form of a liquid mixture on the substrate; and fusing the liquid mixture on the substrate thereby forming an image that undergoes minimal transference of color upon chemical or mechanical abrasion as measured by mOD values ranging between 0 and 100, preferably from 0 to 50. The contacting step may occur at or near the substrate or can occur within an ink-jet pen prior to jetting.

Alternatively, a system for creating a permanent image on a substrate can comprise an ink-jettable black- or color-containing ink-jet ink configured for being ink-jetted on a substrate; an ink-jettable fusible composition configured for being ink-jetted on a substrate; a substrate configured for receiving the black- or color-containing ink-jet ink and the fusible composition upon each being ink-jetted onto the substrate such that the black- or color-containing ink-jet ink and the fusible composition are a mixed liquid on the substrate; and a fuser configured for fusing the mixed liquid on the substrate.

In both the systems and the methods, no pre-coating of fusible material is necessary or even desired. An advantage of the present invention is, for example, the preparation of ink-jettable compositions that can be applied only to areas where black- or color-containing ink-jet ink is applied, thereby reducing quantity of fusible composition needed for use. Further, the present invention can be carried out on plain paper, uncoated transparencies, inorganic coated papers such as silica coated papers, standard swellable media, and the like. In fact, preferably, the substrate should not be pre-coated with a fusible composition and dried, as the invention provides for liquid mixtures of inks and fusible compositions that can both be ink-jetted and fused contemporaneously, or within seconds of one another, for example.

In various embodiments, certain specific fusible compositions can be included, as will be described below.

Fusible Compositions

The fusible compositions that can be used with instant ink-jet ink printing methods can include soluble or miscible polymers or monomers. These fusible compositions can be jetted with an ink-jet ink onto a substrate, or alternatively, can be jetted as a substantially clear composition onto a substrate for liquid mixture with an ink-jet ink composition. In either case, the liquid mixture can be fused to impart a desired degree of permanence. Specifically, it has been found that certain polymers and/or monomers, which behave similar to hydrophobic toners with regard to fusion, can be prepared and dissolved in an aqueous medium, and successfully ink-jetted onto a substrate. The fusible polymers have successfully been synthesized and shown to perform well in aqueous ink systems to produce images with the quality and permanence here to before only achieved in electrophotography.

Among the properties of interest for application of some of these polymers include glass transition temperature (Tg) and melt index (MI). As used herein, glass transition temperature (Tg) will mean the transition that occurs when a liquid is cooled to an amorphous or glassy solid. It also may be the change in an amorphous region of a partially crystalline polymer from a viscous and rubbery state to a hard or brittle state brought about by change in temperature. In this invention, the materials which are used to improve permanence of the images produced can have a Tg that may range from about 40° C. to about 140° C. A more preferred range of glass transition temperatures will range from about 50° C. to about 90° C. Melt index (MI) values for the instant materials may range from about 400 to 3000 grams/10 minutes. A more preferred range may be from about 1800 to 2500 grams/10 minutes. A still more preferred range can be from about 2000 and 2250 grams/10 minutes.

Presented herein are representative examples of syntheses of fusible polymers that provide permanence to the images formed by the materials and processes of the instant invention.

Polymers Comprising a Polymeric Backbone having Amide Side Groups and Acid Side Groups A first group of polymers can be synthesized by condensation reactions to graft, attach, or convert, e.g., by ring opening, substitutes on a "backbone" polymer chain. A backbone can include any constituents that create a polymeric chain. Typically, a backbone will primarily be comprised of carbon atoms, but can include oxygen, sulfur, or nitrogen, for example. Organic groups appended to the backbone are not considered part of the backbone for purposes of the present disclosure.

In one embodiment, a polymer of styrene/maleic anhydride of molecular weight 1600 (average) can be treated with ammonium hydroxide in refluxing tetrahydrofuran, THF, to produce a polymer carbon-based backbone having an amide side group and an acid side group appended thereto on adjacent carbon atoms of the polymer backbone; the polymer can then be treated with additional ammonium hydroxide or ammonium bicarbonate and water, as is necessary or desired. Evaporation of THF will provide an aqueous polymer. It is this polymer that can be dispersed in a liquid vehicle and used in an ink-jet ink printing system or method of the present invention. The average molecular weight of the polymers herein can range from about 900 to about 500,000, preferably from about 1,000 to about 100,000, even more preferably from about 1,000 to about 50,000.

In another example, a polymer of styrene/maleic anhydride of molecular weight 1900 (wt average) can be treated with PEG amine in anhydrous refluxing THF to produce a polymer backbone having a substituted amide side group and an acid side group. The polymer can then be treated with butyl amine to give a desired polymer. In yet another example, a (olefin) styrene/maleic anhydride polymer of MW 1900 can be treated with PEG 350 methylether (0.5 equivalent to PEG to anhydride ratio) in refluxing THF, followed by butyl amine to produce the aqueous solution of the polymer. In each of the above examples, there is a substituted amide group and an acid group on adjacent carbons of the polymer backbone and the resulting polymers produced have a suitable Tg to form films for use with the methods and systems of the present invention, and can be dispersed in a liquid vehicle providing good jettability properties.

Thus, the examples of fusible materials described above are all polymer backbones having amide side groups and acid side groups attached to a carbon-based polymer backbone. However, the amide group can be different in each example. Below are three possible reaction schemes, shown as Formulas 1–3, for the preparation of polymer backbones having acid side groups and three different amide side groups:

Formula 1

Unsubstituted amide

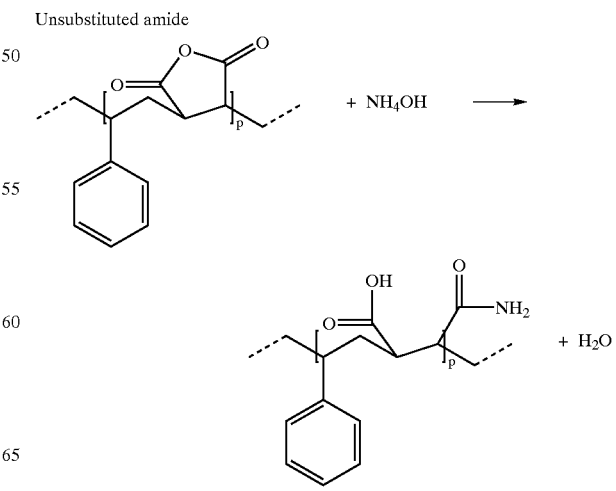

Formula 2

PEG substituted amide

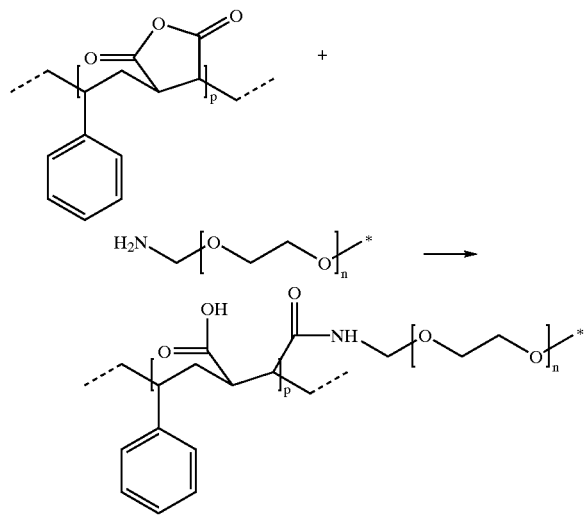

Formula 3

Alkyl/aryl substituted amide

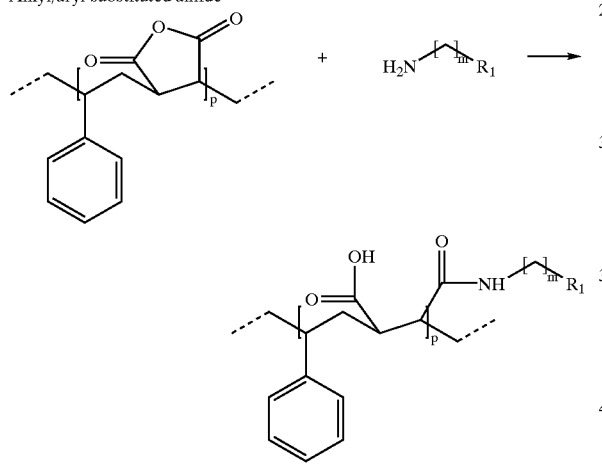

In the above Formulas 1–3, m, n, and p represent repeating units: m is from 0 to about 18, n is from about 3 to about 1,000, and p is from about 2 to about 1,000. R1 can be H, a straight chained alkyl groups, a branch chained alkyl groups, aryl groups, or combination thereof. Straight chained alkyl groups can be from C2 to C50, branch chained alkyl groups can be from C3 to C50, and aryl groups can be from C5 to C50, of which some carbons may be hydroxylated. The counter ion for carboxylate groups in water solution can be an ammonium species, for example.

With these examples in mind, in one embodiment, the fusible composition of either the systems or methods can comprise a polymer backbone having an acid side group and an amide side group attached to the polymer backbone, wherein the amide side group has the formula CONHR, with the proviso that R is other than H, i.e., a substituted amide. In this embodiment, the amide side group can have the formula —CONH(PEG)$_n$, wherein n is from 3 to 1,000. In another embodiment, the amide side group can have the formula —CONH(C)$_m$R$_2$, where m is from 0 to 18, and R$_2$ is selected from the group consisting of H, branched or straight chained lower alkyl groups, aryl groups, and branched or straight chained lower alkyl aryl groups, with the proviso that lower alkyl is 2 for straight chained lower alkyl groups and from 3 to 10 for branched or straight chained lower alkyl groups.

In another embodiment, the amide side group can have the simpler formula CONH$_2$. In both the former and the latter embodiments, the acid side group and the amide side group can be provided by opening a maleic anhydride ring with a nitrogen containing composition.

Though any fusing method can be used, preferably, flash fusing can be used resulting in fusion of the liquid mixture on the substrate at from 0.5 to 4 seconds. In yet another embodiment, all of the components can be present in a single ink-jet printer device, such that the device comprises a flash fuser, the color-containing ink-jet ink composition, and the fusible composition. In addition to the amide and acid groups, the backbone portion of the polymer in this embodiment can also include other alkyl groups, and/or aryl groups appended thereto, wherein such groups are selected from the group consisting of aryl groups, straight chained alkyl groups having from 2 to 50 carbon atoms, branch chained alkyl groups having from 3 to 50 carbon atoms, alkyl/aryl combinations having from 5 to 50 carbons atoms, and combinations thereof.

Polyoxazolines and Oxazolines

A second group of compounds useful for the practice of the invention are oxazolines, polyoxazolines, and intermediates and precursors thereof. As shown in Formula 4 below, and described in literature (See for example, U.S. Pat. Nos. 5,817,169; 5,629,396; 5,644,006; 5,670,590; 5,240,744; and 4,658,011 herein, incorporated by reference), compounds of this series can be converted by effect of heat, dehydration, and catalytic polymerization. One example useful herein is poly-2-ethyl-2-oxazoline available from Polymer Chemistry Innovations, Tucson, Ariz., but it will be apparent to any one familiar with the art that other oxazolines and polyoxazolines can be used with similar success. Formula 4 below depicts a preparative scheme for an oxazoline composition that can be used with the present invention.

Formula 4

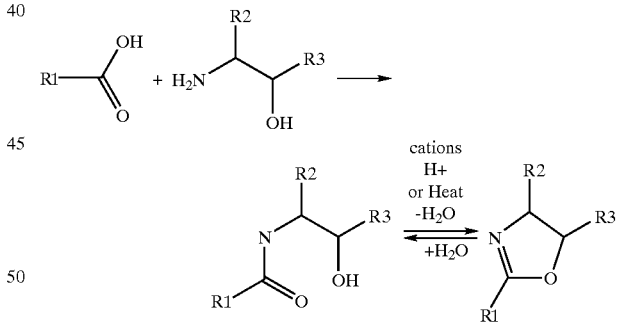

In the above Formula 4, R1, R2 and R3, independently, can be H, straight chained alkyl groups, branch chained alkyl groups, aryl groups, combination thereof. Straight chained alkyl groups can be from C2 to C50, branch chained alkyl groups can be from C3 to C50, and aryl groups can be from C5 to C50, of which some carbons may be hydroxylated. Additionally, R2 and R3 can be part of a single ring structure.

With these examples in mind, the fusible composition of either the method or system of the present invention can comprises a member selected from the group consisting of oxazolines, polyoxazolines, and intermediates and precursors thereof. In one embodiment, the fusible composition can be an oxazoline having the following structure:

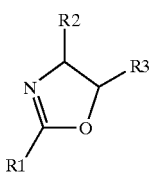

wherein R1, R2, and R3 are, independently, H, straight chained alkyl groups having from 2 to 50 carbon atoms, branch chained alkyl groups having from 3 to 50 carbon atoms, aryl, and combinations thereof. Again, though any fusing process can be used, preferably, a flash fusing step can be carried out at from 0.5 to 4 seconds. Further, a single ink-jet printer device can be provided for this method having a flash fuser, a color-containing ink-jet ink composition, and a fusible composition.

Polyoxazolines can also be used in accordance with the present invention. For example, the oxazoline formed in accordance with Formula 4 can undergo ring opening and polymerization in the presence of certain cations, H+, or heat, for example. A possible reaction scheme is set forth in Formula 5 below.

Formula 5

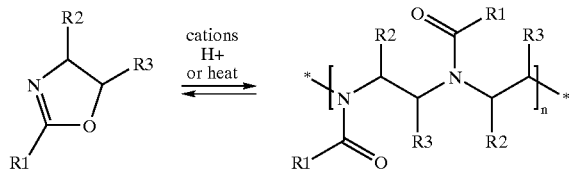

Thus, the fusible composition of either the method or system can comprise a polyoxazoline composition. In one embodiment, the fusible composition can have the following structure:

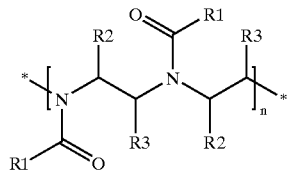

wherein R1, R2, and R3 are, independently, H, straight chained alkyl groups having from 2 to 50 carbon atoms, branch chained alkyl groups having from 3 to 50 carbon atoms, aryl groups, and combinations thereof. Again, though any fusing step can be used to fuse the liquid mixture to the substrate, a flash fusing step is preferably carried out at from 0.5 to 4 seconds. Further, a single ink-jet printer device can be utilized having an integrated or modular configuration comprising a flash fuser, a color-containing ink-jet ink composition, and a fusible composition.

As will be seen in the Examples hereafter, the images prepared by utilizing the methods and systems of the present invention are very resistant to smear. This allows enhanced image quality, demonstrated by the transfer of less than 100 mOD. In this invention, mOD is measured by running a water-based yellow highlighter (Sanford "Major Accent" Highlighting Marker high pH labeled "Fluorescent") across black or colored lines printed on white bond paper. The amount of ink that smears from the lines relates directly to the permanence of the ink-jet ink.

One of the ways to include the fusible material of this invention is to include it in a clear fluid that is not part of the four-color ink set. This technology is sometimes called a "fifth" pen. Fifth pen technology has been used to optimize image quality and water-fastness, but it not believed to have been successfully used to improve permanence prior to the present invention. However, when using the $5^{th}$ pen to eject the fusible material composition of this invention, the substantially colorless and waterborne liquid can coat the substrate and impart permanence to the printed image, after allowing ink-jet ink and fusible composition mixing to occur and fusion of the mixed liquid image.

When the fusible material of the present invention is used in a colorless fluid $5^{th}$ pen device, the amount of fluid used to impart permanence to an image can range from about 0.1 to about 4 times the amount of color ink(s) used in forming the image. In other words, a minimum of one drop of colorless fluid can be applied to a substrate for every ten drops of ink applied. Further, the colorless layer may be applied either over or under the color ink layer forming a liquid mixture, or can be applied such that contact occurs forming a liquid mixture at the area of contact.

The substantially clear fusible composition containing fluids can increase permanence of the color ink images by forming a pigment/polymer dispersant on the surface of the substrate. This reduces penetration of colorant in the media and helps improve the image color, optical density, and brightness of the printed image. Alternatively, the fusible material may also be added to any or all of the colored inks of the standard four-color pen set. Once fused by heat or other means, the permanence can be comparable to laser printed images.

Ink-Jet Ink Colorants

When a pigment is used as a coloring material in the ink composition of the present invention, the amount of pigment used is within the range from about 0.5 to about 20 weight percent. A more preferable range of pigment ranges from about 1 to about 15% by weight. Still more preferred is a range of from about 2% to about 12% by weight percent.

An example of a pigment used for a black ink created image is carbon black. The carbon black may be produced by either a furnace or channel method. The primary particle size of this material can range from 15 to 40 μm, have a specific surface area from about 50 to 300 m2/g, and have an oil absorption value from 40 to 150 ml/100 g. Additionally, such a carbon black pigment can have a volatile component from 0.5 to 10% and a pH value of the composition can range from 2 to 9. Examples of suitable commercially available carbon black pigments can include No. 2300, No. 900, MCF88, No. 33, No. 40, No. 45, No. 52, MA &, MA8, No. 2200B, Raven 1255, Regal 400R, Regal 330R, Regal 660 R, Mogul L, Color Black FW1, Color Black FW18, Color Black S170, Color Black S150, Printex 35, and Printex U.

Further, black colorants containing pigments dispersions include Novofil Black BB-03 and Hostafine Black TS. Novofil Black BB-03 is a pigment that is approximately 27% pigment dispersion based on anionic dispersing agents. It contains C.I. Pigment Black 7, carbon black and is an ultrafine pigment dispersion suitable for all water based ink-jet application. These pigments are available from Clairiant Corp., Coventry, R.I.

Hostafine Black TS contains hydrophilic ultrafine pigment dispersions based on non-ionic dispersing and wetting agents. It contains carbon black and has a pigment concentration of 33%.

Other black colorants, which may be used, include those listed in the Color Index and in Textile Chemist and Colorist reference publications. Water-soluble black colorants are commercially available from colorant vendors such as Cabot Corporation, Orient Chemical, and other manufacturers. Surface modified colorants from these manufacturers are initially water insoluble colorants that, by certain modifications, are solubilized or stabilized as fine dispersions in water to prevent agglomeration. See U.S. Pat. Nos. 5,707,432; 5,630,868; 5,571,311; and 5,554,739 for a discussion of modified carbon black pigments and methods of attaching functionalized groups to aid in their solubility.

Examples of pigments used for a yellow ink include C.I. Pigment Yellow 1, C.I. Pigment Yellow 2, C.I. Pigment Yellow 3, C.I. Pigment Yellow 13, C.I. Pigment Yellow 16, C.I. Pigment Yellow 83, and the like. Examples of pigments used for magenta ink include C.I. Pigment Red 5, C.I. Pigment Red 7, C.I. Pigment Red 12, C.I. Pigment Red 48 (ca), C.I. Pigment Red 48 (mn), C.I. Pigment Red 57 (Ca), C.I. Pigment Red 112, C.I. Pigment Red 122, and the like. Examples of pigments used for a cyan include C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4, C.I. Vat Blue 6, and the like. Pigments whose performance properties are satisfactory when formulated for the present invention are considered to be within the scope of the present invention.

Within the scope of the present invention, specific colorants that can be used include Hostafine Rubine F6B and Hostafine Blue B2G available from Clariant, Coventry, R.I. Hostafines are hydrophilic ultrafine pigment dispersions based on nonionic dispersing and wetting agents, available in all colors. In the present disclosure, Hostafine Rubine F6B is magenta with a 40% pigment content. Hostafine Blue B2G is blue with 40% pigment as well. These colorants are manufactured for suitability with water-based ink-jet inks.

Any pigment, dye, or pigment-resin system available and compatible with the other formulated ingredients of the fusible material of this invention can be used as colorants. An important factor that the formulator must keep in mind is thermal instability exhibited by certain tri- and tetrakis-azo dyes. Such thermal instability may lead to charring of insoluble deposits (kogation), which is to be avoided.

Next, dyes, whether water-soluble or water-insoluble, may be employed in the practice of the present invention. Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company. Examples of water-insoluble dyes include azo, xanthene, methine, polymethine, and anthroquinone dyes. Specific examples of water-insoluble dyes include Ciba-Geigy Orasol Blue GN, Ciba-Geigy Orasol Pink, and Ciba-Geigy Orasol Yellow.

Liquid Vehicle Components

Ink-jet inks comprise a colorant plus a vehicle. Fusible compositions are also carried by an ink vehicle. Ink vehicles can also carry both a colorant and a fusible material.

A typical formulation for an ink useful in the practice of this invention includes the colorant, present in about 0.5 to about 20 weight percent, one or more solvent or co-solvents, present from 0 to 50 weight percent, one or more water-soluble surfactants, present from about 0.1 to 40 weight percent, one or more high molecular weight colloids present from 0 to about 3 weight percent. The balance of the formulation can be purified water, or other vehicle components known in the art such as biocides, viscosity modifiers, materials for pH adjustment, sequestering agents, preservatives, and the like. The colorless fluid can be manufactured similarly except for the absence of a colorant.

One or more co-solvents may be added to the formulation of the ink of this invention. Classes of co-solvents include, but are not limited to, aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like.

One class of preferred co-solvents that provides water miscibility to polymers is glycols. A particularly preferred glycol is polyethylene glycol, commonly abbreviated as PEG. Polyethylene glycol is hydrophilic.

A preferred surfactant employed in the present invention includes Noigen10™. Noigen10™ is a commercially available polymerizable surfactant available from the Montello Company of Tulsa, Okla. Noigen10™ contains polyethylene glycol as a hydrophilic group and an octyl or nonyl phenol as a hydrophobic group. This type of surfactant, which can accommodate both hydrophobic and hydrophilic moieties, is a preferred ingredient in the formation of the fusible material of this invention.

However, other water-soluble surfactants may be employed in the formulation of the vehicle of the ink of this invention. The purpose of surfactants as described herein is to facilitate the miscibility of the ingredients of the ink composition. This is especially important if the fusible material of the ink composition contains both hydrophilic and hydrophobic groups. The surfactant(s) used are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substitued amine oxides, and the like. The amount of surfactant added to the formulation of this invention may range from less than one to about 10 weight percent. A more preferred amount is from 1 to about 3 weight percent.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), and Proxel (ICI America).

Sequestering agents such as EDTA (ethylene diamine tetra acetic acid) may be included to eliminate the deleterious effects of heavy metal impurities, and buffer solutions may be used to control the pH of the ink. Viscosity modifiers may also be present, as well as other additives known to those skilled in the art to modify properties of the ink as desired.

Each of the ingredients in the fusible material can be present for a specific reason. For example, particle size and distribution, stability, surface tension, and various rheological properties are primarily controlled by the type and amount of surfactant employed.

Kogation refers to the charring of insoluble deposits on the printer's heating elements. This clogs the ink-jet print heads and is a problem common to thermal ink-jet printers. For the fusible materials to be resistant to kogation, they must be soluble or miscible in the ink solvents at higher temperatures or in super heated solvent/water vapor. The invention allows inclusion of fusible materials in water based inks used in ink-jet printing. These materials are soluble in the ink composition at higher temperatures or in super-heated solvent/water vapor. As used herein, superheating means the heating of a substance above the temperature at which a change of state would ordinarily happen without the change of state occurring.

Fusing Device

The printing system of this invention includes a printing apparatus that is equipped with suitable heating means. Heat fusion is most often the way that the image formed by toner particles used in electrophotography are fixed to the printed substrate. Most systems employ a heated roller to fix the image although any other means of supplying heat is included within the scope of this invention.

The heated roller is often a rubber roller impregnated with silicone oil which is preheated to about 90° C. It may also be a metal roller heated with incandescent light or a lamp equipped with a reflector. Certain laser printers employ a ceramic heating element in the fusion stage. When the copier or printer is switched on, waiting time until the machine is ready to use is associated with heating the roller.

The heating means is designed to melt (or fuse) the fusible composition and the ink-jet ink together on to the substrate. In high-speed systems, flash fusion may be used and can be a preferred method of fusion. Flash fusion involves the use of heated lamps with a specific heat output are used to rapidly heat the toner which then adheres to the substrate. Fusers are commercially available from such companies that manufacture laser printers such as Hewlett-Packard, Canon, Ricoh, and Panasonic. In all cases, the toner particles used in Electrophotography are hydrophobic. By flash fusing, what is meant is fusion that occurs in less than about 4 seconds.

A typical laser printer commonly available is the Hewlett-Packard Laser Jet 4L Printer. In the fusing stage, toner is fused into the substrate by heat and pressure to produce a permanent image. The substrate (usually paper) passes between a ceramic heating element protected by a thin Teflon sleeve and a soft pressure roller. This melts the toner and presses it into the substrate. Other laser printers use a halogen heating lamp and require frequent warm-up periods to maintain a minimum standby temperature.

It is to be understood that the above-referenced arrangements and descriptions are only illustrative of the application for the principles of the present invention. Numerous modifications and alternative arrangements can be devised without departing from the spirit and scope of the present invention. While the present invention has been described above with particularity and detail in connection with what is presently deemed to be the most practical and preferred embodiments(s) of the invention, it will be apparent to those of ordinary skill in the art that numerous modifications can be made without departing from the principles and concepts of the invention as set forth in the claims.

EXAMPLES

Syntheses of substituted polymers are shown in the following Examples. Specifically, Styrene/Maleic anhydride polymers of MW~1900 available form Polysciences, Warrington, Pa. are used. The type and amount of amine/alcohol for the condensation reaction can be chosen to achieve desired properties such as Tg (glass transition temperature, Melt Index, Hardness etc.). The following examples and comparative examples are intended to illustrate the invention in further detail and not to limit the invention in any way whatsoever.

Example 1

Preparation of Fusible Composition A

Polymer A: Polystyrene/Maleic anhydride polymer, M.W. 1900, available from Polysciences, Warrington, Pa. (18.0 g), is added to a solution of Jeffamine M1000 (22.2 g) (EO/PO Amine, M.W.100, BO/PO 19/3, available from Huntsman Chemical), Hexyl amine (6.75 g) and triethyl amine (9.0 g) in dry THF. The mixture is refluxed for 2 h and stirred at room temperature overnight. The resulting solution is poured in water (400 g) and the organic solvents are removed under reduced pressure (10 mm) and at 40° C. until the weight is 200 g. Next, additional water is added to bring the weight to 470.0 g, which results in a 10% nominal concentration of polymer A.

Example 2

Preparation of Fusible Composition B

Polymer B: Polystyrene/Maleic anhydride polymer, M.W.1900, available from Polysciences, Warrington, Pa. (19.0 g), is suspended in water (75 g) and a solution of 30% Ammonium Hydroxide (6.6 g) is added. After 0.5 h of stirring, the mixture is heated to 85° C. for 0.5 h. The mixture is then cooled and the pH is adjusted to 8.5 using Ammonium Bicarbonate. Water is added to bring the weight to 200 g to produce a 10% nominal concentration of polymer B.

Example 3

Preparation of Fusible Composition C

Polymer C: Polystyrene/Maleic anhydride polymer, M.W.1900, available from Polysciences, Warrington, Pa. (18.0 g), is added to a solution of PEG350 Methyl ether (8.04 g) (available from Aldrich chemical Co., Milwaukee), and the mixture is refluxed for 1 h. Butyl amine (6.75 g) is added, and then, after 15 min reflux, the mixture is stirred overnight. Water (170 g) is added followed by ammonium bicarbonate (3.65 g) and the organic components are evaporated under reduced pressure at 50° C. Additional water is added to bring the weight to 270.0 g, which results in a 10% nominal concentration of polymer C.

Example 4

Synthesis of Primer Polymer

Synthesis of a primer polymer, which is not smear resistant, but boosts the performance of fusible materials.

See U.S. patent application Ser. Nos. 09/120,046 and 09/120,270, both filed Jul. 21, 1998, which are fully incorporated herein by reference.

A primer polymer used to improve the performance of fusible materials is synthesized as follows: 5684.9 g water and 24.0 g potassium persulfate is charged in a reactor. The organic part of the monomer feed: 747.0 g methyl methacrylate (MMA), 1073.7 g hexyl acrylate (HA), 280.1 g methoxy polyethylene glycol (350) methacrylate (from Polysciences, Inc.) 233.4 g (acrylic acid) AA, and 23.3 g iso-octyl thioglycolate (from Zeneca, Inc.), is added to the feed tank. Next, the water phase of the monomer feed (1082.2 g water and 65.4 g Rhodcal) was added to the feed tank. The monomer feed is emulsified until a stable form of the feed is obtained. Next, the reactor phase is raised to 90° C. where the addition of the monomer feed (150 min) is started. Directly after finishing the first monomer feed, the feed tank is rinsed with 75.0 g water. After this addition, the reactor is kept at 90° C. for another 30 min, after which a burn up reaction is performed. Next, the burn up reaction is cooled down to 30° C. and 28.7 g Proxel GXL in 30.0 g water is added. Extra water is added if necessary for solids correction. Additionally, a pH correction is performed by the addition of 26.1 g of an aqueous 10% KOH solution to obtain a pH of 8.24. After filtration over 50: m filter almost no sediment is obtained.

Synthesis data and smear performance results from the synthesis of the primer polymer are as follows:

Monomer ratio of MMA/HA/MPEG(350)MA/AA is 32/46/12/10

| Polymer prepared at 25% solids | |
| --- | --- |
| Potassium Persulfate | 1.03% on monomers |
| Rhodcal RS710 | 2.80% on monomers |
| BRIJ 92 | 1.55% on monomers |
| iso-octyl thioglycolate | 1.00% on monomers |

Example 5

Ink Formulation Procedure

The table below indicates the amount and type of ingredients used to prepare samples of ink-jettable ink formulated with the polymers synthesized by the above procedures. All the inks were filtered through 5 micron nylon filters available from Micron Separations, Inc. The inks were filled in HP 850C pens and warmed to 60° C. before printing.

TABLE 1

| Ink formulation A–C: | | | |
| --- | --- | --- | --- |
| | A | B | C |
| Pigment | Novofil black BB-03 | Hostafine Black TS | Hostfine Black TS |
| Pigment concentrate | 14.8 g | 13.3 g | 15 g |
| 2-Pyrrolidone | 10.0 g | 10.0 g | 10.0 g |
| 1,5-Pentanediol | 10.0 g | 10.0 g | 10.0 g |
| Polymer A solution | 21.4 g | | |
| Polymer B solution | | 21.4 g | |
| Poly(2-ethyl-2-oxazoline) | | | 5.0 g |
| Water | 33.8 g | 35.3 g | 50.0 g |
| Multranol 4012 | 10.0 g | 10.0 g | |
| Tetraethylene glycol | | | 10.0 g |

TABLE 2

| Ink formulation D: | |
| --- | --- |
| Ingredient | Quantity (wt %) |
| Cabojet 300 (10% conc.) Black | 27.01 |
| Polymer C solution (10%) | 30.14 |
| Primer polymer | 6.39 |
| Leg-1 | 8 |
| Surfanol-465 | 0.07 |
| Coco betaine | 0.2 |
| Dodecanol | 0.14 |
| Leg-7 | 1 |
| 2-Pyrrolidone | 7.02 |
| Neopentyl alcohol | 0.41 |
| Water | 19.87 |

Notes on the Ink Formulation Ingredients:

Poly(2-ethyl-2oxazoline) is obtained from Polymer chemistry innovations of Tucson, Ariz. 2-Pyrrolidine is used as a penetrant to facilitate interaction between the ink and the substrate.

1,5-Pentanediol and tetraethylene glycol are used as humectants, to maintain moisture and keep the pen from drying.

Multranol 4012, LEG 1, LEG 7, Coco betaine, Surfanol 465 are commercially available surfactants.

Example 6

Permanence Testing: Procedures

The smear resistance which serves as a measure of mechanical and chemical (solvent) abrasion is measured by transfer of amount of color (or black) in milli optical density (mOD) units measured using MacBeth RD918 optical density meter (available form MacBeth, a division of Kollmorgen Instruments Corporation, New Windsor, N.Y.). The measurements were recorded after running a fluorescent highlighter twice over a set of bars printed using an ink-jet printer, each containing one of inks A–D of Example 5.

The permanence of images demonstrated by electrophotography (laser printing or copying), provide a base which represents the least amount of transfer and lowest mOD numbers. Since the MacBeth instrument reports mOD units of transferred color in this experiment, lower number indicates less transfer. In other words, lower numbers indicate better performance. The markers used for the present tests are sold commercially under the trademark MAJOR ACCENT and are read through fluorescent highlighting markers (alkaline highlighting marker).

The tables below show comparative values of some of the commercially available transfer obtained from such smear tests. The process of 'fusion' is important for imparting permanence to the inks of the invention. Therefore, the comparison of 'before fusion' and 'after fusion' data indicates the efficiency of the particular fusible material. Fusion indicates a treatment through heat press HIX N800 for 3 seconds at 190° C. or running the paper through a fuser attached to an ink-jet printer so the paper path directly coincides with fuser uptake. Experiments were performed across a set of five papers to prove effectiveness of this approach on a variety of paper substrates. Specifically, the five papers used were champion data copy (CDCY), Gilbert bond (GBND), Stora Papyrus MultiCopy (PMCY), Stora Papyrus Natura (PNAT) and union Camp Jamestown (UCJT) available commercially. As can be seen in Tables 3–5, polymers A, B and C of the instant invention produced comparable results.

The propensity of a paper to absorb moisture because of the hydrophilic nature of its cellulose has considerable implications for its behavior with various ink formulations. Paper, in an ambient relative humidity of 50%, can contain up to eight weight percent water. This moisture can become a controlling factor in the performance of the paper as a substrate in both electophotography and ink-jet printing.

Permanence Testing: Results

TABLE 3

Ink Formulation A - Two pass highlighter smear 5 min after printing
Values in mOD

| PAPER | Alkaline | | | | | Acid | | | | |
| --- | --- | --- | --- | --- | --- | --- | --- | --- | --- | --- |
| | CDCY | GBND | PMCY | PNAT | UCJT | CDCY | GBND | PMCY | PNAT | UCJT |
| Before | 243.3 | 330.0 | 117.6 | 220.0 | 280.0 | 220.0 | 280.0 | 96.7 | 197.0 | 266.7 |
| After | 68.0 | 75.0 | 86.7 | 70.0 | 40.0 | 53.3 | 63.3 | 30.0 | 50.0 | 23.3 |

TABLE 4

Ink Formulation B - Two pass highlighter 5 min after printing
Values in mOD

| PAPER | Alkaline | | | | | Acid | | | | |
| --- | --- | --- | --- | --- | --- | --- | --- | --- | --- | --- |
| | CDCY | GBND | PMCY | PNAT | UCJT | CDCY | GBND | PMCY | PNAT | UCJT |
| Before | 216.7 | 320.0 | 186.7 | 463.3 | 196.7 | 196.0 | 286.0 | 140.0 | 286.7 | 40.0 |
| After | 97.0 | 113.3 | 90.7 | 96.7 | 20.0 | 85.0 | 95.7 | 71.0 | 86.7 | 12.0 |

TABLE 5

Smear resistance of ink containing
poly(2-ethyl-2-oxazoline) and Hostfine Black TS colorant
Values in mOD

| PAPER | GBND | CDCY | UJCT | PMCY | PNAT |
| --- | --- | --- | --- | --- | --- |
| Before | 400 | 384 | 353 | 544 | 516 |
| After | 147 | 118 | 98 | 138 | 128 |

TABLE 6

Ink Formulation C - Two pass highlighter 5 min after printing
Values in mOD

| PAPER | GBND | CDCY | UJCT | PMCY | PNAT |
| --- | --- | --- | --- | --- | --- |
| Before | 400 | 384 | 353 | 544 | 516 |
| After | 98 | 85 | 77 | 114 | 103 |

TABLE 7

Comparative Example A (state of the art HP ink-jet ink)

HP 2000C Black - Two pass highlighter 5 min after printing
Values in mOD

| PAPER | Alkaline | | | | | Acid | | | | |
| --- | --- | --- | --- | --- | --- | --- | --- | --- | --- | --- |
| | CDCY | GBND | PMCY | PNAT | UCJT | CDCY | GBND | PMCY | PNAT | UCJT |
| Before | 272.50 | 249.67 | 230.67 | 389.00 | 393.50 | 237.33 | 219.00 | 207.33 | 472.00 | 277.67 |
| After | 318.50 | 275.50 | 309.50 | 479.17 | 473.67 | 157.17 | 154.00 | 212.33 | 361.17 | 317.50 |

TABLE 8

Comparative Example B (state of the art Canon ink-jet ink)
Canon BJ F 800 Black - Two pass highlighter 5 min after printing
Values in mOD

| | Alkaline | | | | | Acid | | | | |
|---|---|---|---|---|---|---|---|---|---|---|
| PAPER | CDCY | GBND | PMCY | PNAT | UCJT | CDCY | GBND | PMCY | PNAT | UCJT |
| Before | 435 | 560 | 557 | 433 | 384 | 453 | 367 | 467 | 360 | 327 |
| After | 454 | 527 | 535 | 503 | 407 | 333 | 325 | 327 | 253 | 358 |

TABLE 9

Comparative Example C (laser printer)
HP Laser Jet 4L Printer C2003A - Two pass highlighter 5 min after printing
Values in mOD

| | Alkaline | | | | | Acid | | | | |
|---|---|---|---|---|---|---|---|---|---|---|
| PAPER | CDCY | GBND | PMCY | PNAT | UCJT | CDCY | GBND | PMCY | PNAT | UCJT |
| Before | NA | NA | NA | NA | NA | NA | NA | NA | NA | NA |
| After | 1 | 4 | 0 | 2 | 0 | 0 | 0 | 0 | 0 | 0 |

TABLE 10

Comparative Example D (laser copier)
Lanier 6765 Office Copier - Two pass highlighter 5 min after printing
Values in MOD

| | Alkaline | | | | | Acid | | | | |
|---|---|---|---|---|---|---|---|---|---|---|
| PAPER | CDCY | GBND | PMCY | PNAT | UCJT | CDCY | GBND | PMCY | PNAT | UCJT |
| Before | NA | NA | NA | NA | NA | NA | NA | NA | NA | NA |
| After | 0 | 1 | 0 | 0 | 0 | 0 | 0 | 0 | 0 | 0 |

It can be seen that the permanence testing results of the instant invention, using a variety of inks and more than one fusible material (Tables 3–6) exhibit much better permanence as compared to images produced by other ink-jet printers without the use of the fusible compositions of the present invention. The mOD values before fusing, as seen in the above tables, are as low as 40, and are much lower than those in Tables 7 and 8. The mOD values in 7 (Hewlett-Packard) and Table 8 (Canon) are for current state of the art ink-jet printers. They are consistently greater than 200 before fusing and often after fusing.

The mOD values shown in Tables 3–6 after fusion are striking. The mOD values for the examples of the invention drop as low as 100 or less. In the comparative examples, the mOD values range from 154 to 535. In the comparative examples, in many cases, the mOD values are even higher after fusing. This shows that the inks in currently used and commercially available ink-jet printers do not produce images that are made permanent by fusion.

In contrast, the values for mOD shown in Table 9 (HP Laser Jet 4L Printer C2003A) and Table 10 (Lanier 6765 Office Copier) are less than 10. This was to be expected as they are both laser printing systems. Thus, by comparing Tables 3–6 to Tables 9–10, it is clear that in many instances, ink-jet produced images are almost as permanent as electrophotography produced images.

What is claimed is:

1. A method for creating a permanent image on a substrate, comprising:

ink-jetting a black- or color-containing ink-jet ink composition onto a substrate;

ink-jetting a fusible composition carried by a liquid vehicle onto said substrate, said fusible composition comprising a polymer backbone having an acid side group and a substituted amide side group attached to the polymer backbone, said substituted amide side group having the formula CONHR, wherein R is $(PEG)_n$, wherein n is from 3 to 1,000; or R is $(C)_m R_2$, where m is from 0 to 18, and $R_2$ is selected from the group consisting of H, branched or straight chained lower alkyl groups, aryl groups, and branched or straight chained lower alkyl aryl groups, with the proviso that lower alkyl is 2 for straight chained lower alkyl groups and from 3 to 10 for branched or straight chained lower alkyl groups;

contacting said ink-jet ink composition and said fusible composition such that said ink-jet ink composition and said fusible composition are in the form of a liquid mixture on the substrate; and fusing said liquid mixture on said substrate thereby forming an image that undergoes minimal transference of black or color upon chemical or mechanical abrasion as measured by mOD values ranging between 0 and 100.

2. A method as in claim 1 wherein the substrate is not pre-coated with said fusible composition prior to said ink-jetting steps.

3. A method as in claim 1 wherein the acid side group and the amide side group is provided by opening a maleic anhydride ring with a nitrogen containing composition.

4. A method as in claim 1 wherein R is (PEG)$_n$.

5. A method as in claim 1 wherein R is (C)$_m$R$_2$.

6. A method as in claim 1 wherein said fusing step is flash fusing and is carried out at from 0.5 to 4 seconds.

7. A method as in claim 1 further comprising the step of providing a single ink-jet printer device, said device comprising a flash fuser, the black- or color-containing ink-jet ink composition, and the fusible composition.

8. A method as in claim 1 wherein said fusible composition has a glass transition temperature ranging from between about 50° C. to about 90° C.

9. A method as in claim 1 wherein the liquid vehicle comprises water and a member selected from the group consisting of biocides, viscosity modifiers, materials for pH adjustment, sequestering agents, preservatives, surfactants, solvents, co-solvents, and mixtures thereof.

10. A method as in claim 1 wherein said polymer backbone further comprises an additional organic group appended thereto, said organic group selected from the group consisting of aryl groups, straight chained alkyl groups having from 2 to 50 carbon atoms, branch chained alkyl groups having from 3 to 50 carbon atoms, alkyl/aryl combinations having from 5 to 50 carbons atoms, and combinations thereof.

11. A method as in claim 1 wherein the contacting step occurs on the substrate.

12. A method as in claim 1 wherein the contacting step occurs prior to the ink-jetting steps.

13. A method for creating a permanent image on a substrate, comprising:
   ink-jetting a black- or color-containing ink-jet ink composition onto a substrate;
   ink-jetting a fusible composition carried by a liquid vehicle onto said substrate, said fusible composition comprising a polymer backbone having an acid side group and an amide side group attached to the polymer backbone, said amide side group having the formula CONH$_2$;
   contacting said ink-jet ink composition and said fusible composition such that said ink-jet ink composition and said fusible composition are in the form of a liquid mixture on the substrate; and
   fusing said mixture on said substrate thereby forming an image that undergoes minimal transference of black or color upon chemical or mechanical abrasion as measured by mOD values ranging between 0 and 100.

14. A method as in claim 13 wherein the substrate is not pre-coated with said fusible composition prior to said ink-jetting steps.

15. A method as in claim 13 wherein the acid side group and the amide side group is provided by opening a maleic anhydride ring with a nitrogen containing composition, resulting in the CONH$_2$ side chain.

16. A method as in claim 13 wherein said fusing step is flash fusing and is carried out at from 0.5 to 4 seconds.

17. A method as in claim 13 further comprising the step of providing a single ink-jet printer device, said device comprising a flash fuser, the black- or color-containing ink-jet ink composition, and the fusible composition.

18. A method as in claim 13 wherein said fusible composition has a glass transition temperature ranging from between about 50° C. to about 90° C.

19. A method as in claim 13 wherein the liquid vehicle comprises water and a member selected from the group consisting of biocides, viscosity modifiers, materials for pH adjustment, sequestering agents, preservatives, surfactants, solvents, co-solvents, and mixtures thereof.

20. A method as in claim 13 wherein said polymer backbone further comprises an additional organic group appended thereto, said organic group selected from the group consisting of aryl groups, straight chained alkyl groups having from 2 to 50 carbon atoms, branch chained alkyl groups having from 3 to 50 carbon atoms, alkyl/aryl combinations having from 5 to 50 carbons atoms, and combinations thereof.

21. A method as in claim 13 wherein the contacting step occurs on the substrate.

22. A method as in claim 13 wherein the contacting step occurs prior to the ink-jetting steps.

23. A method for creating a permanent image on a substrate, comprising:
   ink-jetting a black- or color-containing ink-jet ink composition onto a substrate;
   ink-jetting a fusible composition onto said substrate, said fusible composition comprising a member selected from the group consisting of oxazolines and polyoxazolines;
   contacting said ink-jet ink composition and said fusible composition such that said ink-jet ink composition and said fusible composition are in the form of a liquid mixture on the substrate; and
   fusing said mixture on said substrate thereby forming an image that undergoes minimal transference of black or color upon chemical or mechanical abrasion as measured by mOD values ranging between 0 and 100.

24. A method as in claim 23 wherein the substrate is not pre-coated with said fusible composition prior to said ink-jetting steps.

25. A method as in claim 23 wherein said fusible composition contains an oxazoline having the following structure:

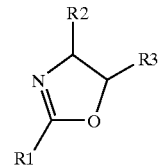

wherein R1, R2, and R3 are, independently, H, straight chained alkyl groups having from 2 to 50 carbon atoms, branch chained alkyl groups having from 3 to 50 carbon atoms, aryl groups, alkyl/aryl groups having from 5 to 50 carbon atoms, and combinations thereof.

26. A method as in claim 23 wherein said fusible composition comprises a polyoxazoline having the following structure:

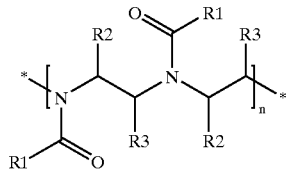

wherein R1, R2, and R3 are, independently, H, straight chained alkyl groups having from 2 to 50 carbon atoms, branch chained alkyl groups having from 3 to 50 carbon atoms, aryl groups, alkyl/aryl groups having from 5 to 50 carbon atoms, and combinations thereof.

27. A method as in claim 23 wherein said fusing step is flash fusing and is carried out at from 0.5 to 4 seconds.

28. A method as in claim 23 further comprising the step of providing a single ink-jet printer device, said device comprising a flash fuser, the black- or color-containing ink-jet ink composition, and the fusible composition.

29. A method as in claim 23 wherein said fusible composition has a glass transition temperature ranging from between about 50° C. to about 90° C.

30. A method as in claim 23 wherein the fusible composition is carried by a liquid vehicle comprising water and a member selected from the group consisting of biocides, viscosity modifiers, materials for pH adjustment, sequestering agents, preservatives, surfactants, solvents, co-solvents, and mixtures thereof.

31. A method as in claim 23 wherein the contacting step occurs on the substrate.

32. A method as in claim 23 wherein the contacting step occurs prior to the ink-jetting steps.

33. A system for creating a permanent image on a paper substrate, comprising:

an ink-jettable black- or color-containing ink-jet ink configured for being ink-jetted on a substrate;

an ink-jettable clear fusible composition configured for being ink-jetted on a substrate, said clear fusible composition consisting essentially of a fusible composition in a liquid vehicle;

a substrate configured for receiving the black- or color-containing ink-jet ink and the fusible composition upon each being ink-jetted onto the substrate such that the black- or color-containing ink-jet ink and the fusible composition are a mixed liquid on the substrate; and a fuser configured for fusing the mixed liquid on the paper substrate.

34. A system as in claim 33 wherein the substrate is a paper substrate that is not coated with an organic polymer.

35. A system as in claim 33 wherein the fusible composition comprises a polymer backbone having an acid side group and an amide side group attached to the polymer backbone, said amide side group having the formula CONHR, with the proviso that R is other than H.

36. A system as in claim 33 wherein the fusible composition comprises a polymer backbone having an acid side group and an amide side group attached to the polymer backbone, said amide side group having the formula $CONH_2$.

37. A system as in claim 33 wherein the fusible composition comprises a member selected from the group consisting of oxazolines and polyoxazolines.

38. A system as in claim 33 wherein the ink-jettable black- or color-containing ink-jet ink and the ink-jettable fusible composition are configured to be mixed on the substrate.

39. A system as in claim 33 wherein the ink-jettable black- or color-containing ink-jet ink and the ink-jettable fusible composition are configured to be mixed prior to ink-jetting.

* * * * *